United States Patent
Patil et al.

(10) Patent No.: US 10,019,191 B2
(45) Date of Patent: Jul. 10, 2018

(54) SYSTEM AND METHOD FOR PROTECTING CONTENTS OF SHARED LAYER RESOURCES

(71) Applicant: Dell Products L.P., Round Rock, TX (US)

(72) Inventors: Rushikesh P. Patil, Sunnyvale, CA (US); Puneet Kaushik, Fremont, CA (US); Satya Mylvara, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 14/866,299

(22) Filed: Sep. 25, 2015

(65) Prior Publication Data

US 2016/0342361 A1 Nov. 24, 2016

Related U.S. Application Data

(63) Continuation-in-part of application No. 14/719,248, filed on May 21, 2015, now Pat. No. 9,665,283.

(51) Int. Cl.
*G06F 3/06* (2006.01)

(52) U.S. Cl.
CPC ............ *G06F 3/0643* (2013.01); *G06F 3/062* (2013.01); *G06F 3/0604* (2013.01); *G06F 3/0629* (2013.01); *G06F 3/0673* (2013.01)

(58) Field of Classification Search
CPC ...... G06F 3/0643; G06F 3/0604; G06F 3/062; G06F 3/0629; G06F 3/0673
See application file for complete search history.

(56) References Cited

U.S. PATENT DOCUMENTS

| | | | | |
|---|---|---|---|---|
| 8,082,411 | B1* | 12/2011 | Seetharam | G06F 3/0617 709/225 |
| 2003/0193858 | A1* | 10/2003 | Yonekawa | G11B 20/00086 369/47.13 |
| 2012/0117659 | A1* | 5/2012 | Gearhart | G06F 21/10 726/27 |
| 2016/0342621 | A1* | 11/2016 | Mylvara | G06F 17/30235 |

* cited by examiner

*Primary Examiner* — Hiep Nguyen
(74) *Attorney, Agent, or Firm* — Baker Botts L.L.P.

(57) ABSTRACT

A method and system for handling a file operation directed to an original file of a protected layer. A protected layer and a user- or device-specific write layer associated with the protected layer are both mounted. File open operations directed to an original file on the protected layer are instead redirected to one of a dummy file associated with the original file or a write-layer copy of the original file located on the write layer. If neither a dummy file nor a write-layer copy of the original file are on the write layer, a dummy file having the same file name and file attributes as the original file is created in the write layer. Subsequent file operations, such as reading, writing, and closing, are directed to the one of the dummy file or the write-layer copy.

20 Claims, 2 Drawing Sheets

SYSTEM AND METHOD FOR PROTECTING CONTENTS OF SHARED LAYER RESOURCES

PRIORITY

This application is a continuation-in-part under 35 U.S.C. § 120 of U.S. patent application Ser. No. 14/719,248, filed May 21, 2015.

TECHNICAL FIELD

This disclosure relates generally to information handling systems and, more particularly, to providing layered resources to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

SUMMARY

In one embodiment, a method of preserving a protected layer comprises loading one or more layering drivers of a layering client, mounting the protected layer, which comprises an original file and read-only application layer shared between one or more users and devices. A device- or user-specific write layer is also mounted. An file open request from a calling application and directed to the original file may be received. In response, the file open request is redirected to one of a dummy file associated with the original file or a write-layer copy of the original file, each of which is stored on the write layer. A handle is then returned to the dummy file or the write-layer copy.

In certain embodiments, the write layer is associated with one of a user or a device and the contents of the write layer are private to the user or device.

In other embodiments, the method further comprises determining that the write layer does not contain either a dummy file or a write-layer copy corresponding to the original file. In response, a dummy file is created on the write layer. The file name and file attributes of the dummy file are set to those of the original file and a handle is returned to the dummy file.

In another embodiment, a read operation directed to an open file handle corresponding to a dummy file may be received. In response, the original file corresponding to the dummy file is opened and the read operation is satisfied by reading data from the original file.

In another embodiment, a write operation directed to an open file handle corresponding to a dummy file may be received. In response, the dummy file is replaced with a write-layer copy of the original file by copying the original file. The write operation is then redirected to the write-layer copy.

Another embodiment includes receiving a close operation directed to the open handle. The handle is then closed and the dummy or write-layer copy corresponding to the handle is deleted. Deleting the write-layer copy further comprises determining that the write-layer copy has not been modified from the original file.

In another embodiment, the protected layer is unmounted and the dummy file or the write-layer copy corresponding to the original file is deleted. Deleting the write-layer copy further comprises determining that the write-layer copy has not been modified from the original file.

In one embodiment, one or more computer-readable non-transitory storage media embodying logic is operable when execute to perform any one or more of the described embodiments.

In another embodiment, an information handling system comprises one or more processors and a memory coupled to the processors where the memory comprises instructions executable by the processors and where the processors are operable when executing the instructions to perform any one or more of the described embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
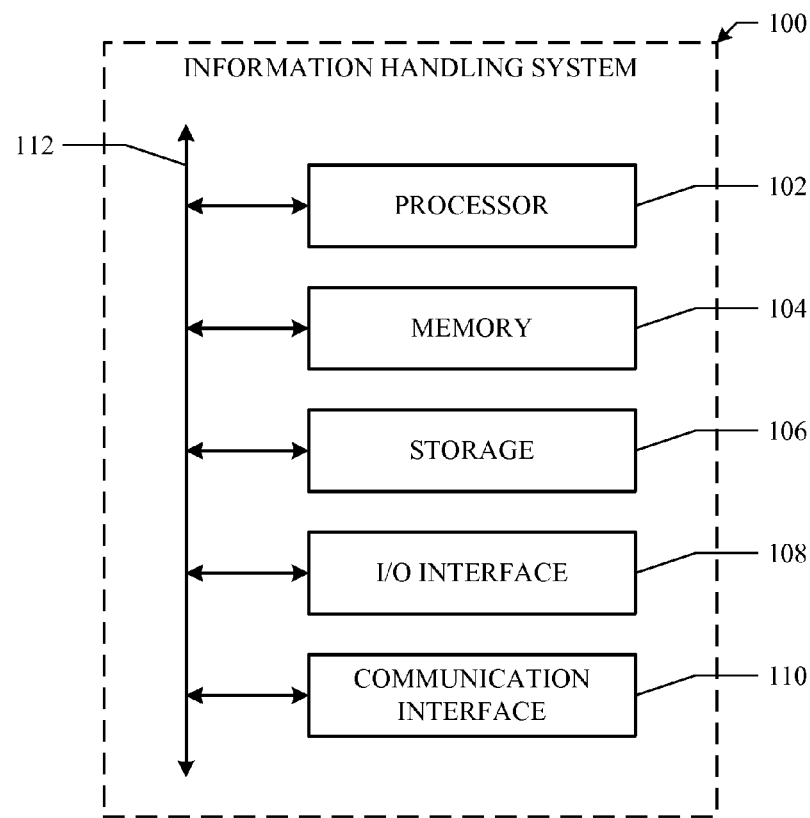
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
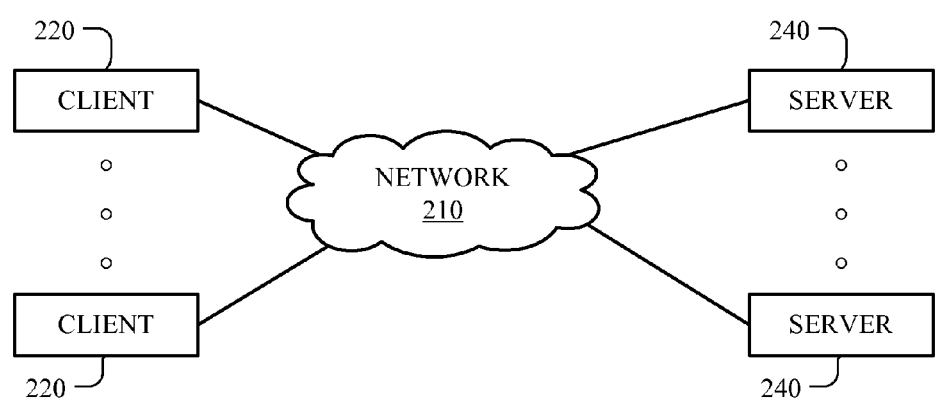
FIG. 2 is an example of a network environment.

Particular embodiments are best understood by reference to FIGS. 1-2, wherein like numbers are used to indicate like and corresponding parts.

Application layers may be shared between different users working from different client machines. Contents sharing may be rather simple between users as long as all users are working in read-only mode. However, this is not always practical. Users may need to modify the contents of a resource or file but such modifications need to be kept restricted to each individual user. All the modifications must be captured and stored in a user-specific layer/storage. It may be necessary to protect the original contents of the layer from all the modifications by the various users.

A copy of the entire file that is being accessed and modified may be made. For example, a standard copy-on-write mechanism may be used. This copy is created on the read-write layer which is user specific and not shared with other users. This keeps the original file that was copied unmodified. Any operations related to the original file are redirected to the newly created file on the read-write layer. Contents for all the unmodified original files are fetched from the shared applications layer. Each layer is a separate volume of the operating system with the original file and the user-specific file being on different instances of the file system. Each file system instance does not know about the other occurrence of the file.

To ensure that synchronization does not become a problem or that a user is not ever permitted to open a file directly on a read-only layer, a dummy file is created on the user-specific write layer and any open request gets redirected to the dummy file. Any user read request is serviced by using the contents from the original file. For a write request, the contents from the original file are copied to the newly created dummy file on the user specific read-write layer, creating a write-layer copy of the original file. A write request to the user is then passed to the write-layer copy. All future operations (for example, open, read, write, close, etc.) directed to the original file are performed on the dummy file or the write-layer copy to preserve the original file. All applications and the operating system interact only with the one instance of the file system, for example, the file system for the read-write layer. As all the cached and non-cached operations are performed on either the dummy file or the write-layer copy, synchronization among these operations is taken care of by the operating system file system and cache manager. The layering design is simplified as it is no longer necessary to synchronize the cached and non-cached data across multiple instances of file systems. The shared file contents are also protected against any user writes (by storing on the read only layer) while preserving user specific modifications by storing on the read-write layer).

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

A system and method for providing layered resources to an information handling system is disclosed herein. A layer is a container or collection of data or resources. The data or resources may comprise executable code, such as an operating system or user application. The data or resources may comprise configuration data for an information handling system, such as registry settings in a Microsoft Windows environment, or other data structures used to store configuration settings, such as text files, XML files, and the like. The data or resources may comprise files in any format, including but not limited to, text files, HTML files, or proprietary files such as Microsoft Word ".DOC" or ".DOCX" files or Microsoft Excel ".XLS" spreadsheets.

Figure 3:
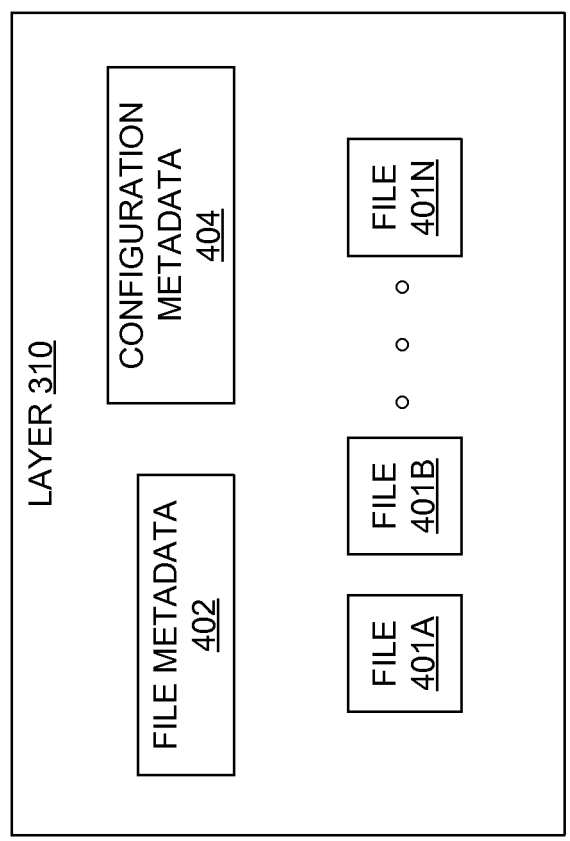
FIG. 3 is an example of a layer.

FIG. 3 illustrates a particular embodiment of a layer 310. In this embodiment, layer 310 contains one more or more files or resources 401A-401N associated with an application, such as Microsoft Word, Microsoft Excel, Microsoft Outlook, Adobe Acrobat, or the FireFox web browser. The files or resources 401A-N may comprise executable code, non-executable data (e.g., images, help files, templates, et cetera), or a combination of executable and non-executable data. The layer may also contain configuration information necessary for the application to run on the information handling system. For example, for an application executable by a Microsoft Windows operating system, the application may require one or more registry settings. Therefore, the layer may store the registry keys and values associated with the application. The registry keys and values may be stored as metadata. In particular embodiments, the registry keys and values may be stored in a registry hive in the layer.

In particular embodiments, the layer comprises an operating system image, and files 401A-401N comprise the executable and non-executable files associated with a particular operating system. For example, the files may comprise the bootloader, the kernel, hardware drivers, software drivers, and other files associated with the operating system. The layer may also contain configuration information necessary for the operating system, such as environment settings and network configuration settings.

In particular embodiments, a layer may contain data or resources for more than one application or operating system. For example, an organization may create an "Accounting Department" layer that contains all the files, resources, or configuration settings necessary for applications deployed to users in the organization's accounting department. Continuing with this example, the accounting department layer may contain an image of Microsoft Excel, Microsoft Word, and other applications typically deployed to users in the accounting department, all in a single layer. In particular embodiments, the layer may also contain files, resources, or configuration settings for one or more operating systems.

A layer may also contain metadata that describes the contents of the layer. Any suitable data structure, such as an XML file, a hash table, a tree data structure, an array, a linked list, or a Microsoft registry hive, may be used to store the metadata. The layer may contain one or more data structures to store the metadata. Referring to the particular embodiment depicted in FIG. 3, layer 310 comprises file metadata 402 and configuration metadata 404. File metadata 402 may comprise one or more data structures identifying the files 401A-401N stored in layer 310, identify one or more logical blocks associated with the files, or identify one or more logical-to-physical mappings of the files. Configuration metadata 404 may store configuration settings associated with the layer, or identify where configuration settings associated with the layer are stored. In particular embodiments, registry key and value pairs are stored in configuration metadata 404. In particular embodiments, the configuration metadata is stored in a Microsoft registry hive.

No particular storage medium is required for storing a layer and the associated data or resources. By way of example and not by way of limitation, layer 310 may be stored on a hard disk drive (e.g., a partition the hard disk drive), a virtual disk, a RAM disk, a USB storage device, a Flash storage device, a DVD (digital versatile disc), or any other suitable storage medium. The storage medium may be local to the information handling system. In particular embodiments, the storage medium may be remote from the information handling system. For example, the storage medium may comprise a network file share (e.g., an Network File System share, an NTFS/SMB file share), a block-based network share (e.g., storage area network using Fibre-Channel or iSCSI), or a cloud storage service. In a particular embodiment, a layer may be stored on a streaming virtual disk (vDisk). By way of example and not by way of limitation, an implementation of a streaming vDisk is available from Dell Inc. In particular embodiments, a layer may comprise a folder or directory on a storage medium where the data and resources associated with the layer are stored. For example, a layer may comprise a partition of a streaming Virtual Disk (vDisk) where all of the data and resources associated with the layer are stored.

In particular embodiments, a layer may be stored remotely from the information handling system. If the information handling system maintains connectivity to the remote storage medium, the layer may remain remotely stored from the information handling system. In particular embodiments, the layer (or portions of the layer) may be cached or staged to a storage medium local to the information handling system. For example, caching or staging a layer locally may permit increased performance during runtime or permit offline usage of the layer. The layering system and method disclosed herein does not require that the one or more layers provided to the information handling system be stored on a single type of storage medium or at a single location. By way of example and not by way of limitation, an information handling system may be provided with access to a first layer that is stored on a local storage medium, and a second layer that is stored on a remote storage medium.

In particular embodiments, the layering system comprises a layering client, a layering file-system filter driver (LFFD), and a layering registry filter driver (LRFD) provided for the information handling system.

In particular embodiments, the layering client is responsible for managing the mounting of layers. The layering client may determine which layers are to be mounted based upon the identity of the user, a role associated with the user, an identifier of the information handling system, a geographic location, or any other criteria that may be relevant to provisioning software to an information handling system. Layers may be mounted at boot time (such as when a layer is used to provide the operating system), during a log-on process, or dynamically (such as when a user clicks an icon associated with a layer resource). In particular embodiments, a layer is mounted as a file system and is assigned an available drive letter. The drive may be hidden from the user to prevent a user from directly accessing or modifying the contents of the layer. When more than one layer is mounted, the layering client may assign a priority or ordering to the mounted layers. The assigned priority or ordering may be used to resolve conflicts between layers, such as when more than one mounted layer contains a similarly named resource.

In particular embodiments, the criteria or rules to mount a layer are decoupled from the client device where layers are actually mounted. For example, the layering client may send an identifier associated with the current user and an identifier associated with the client device to a management server. The management server is responsible for applying the criteria or rules to determine which layers the client device should mount. The rules or criteria may comprise any combination of user name, a group associated with the user, time of the day, type of device (laptop/PC/Tablet), or any other suitable criteria.

In particular embodiments, the layering client may configure the other layering drivers provided for the information handling system. For example, the layering client may notify the layering drivers when a layer has been mounted or dismounted. The layering client may also be used to alter the operating state of the layering drivers. For example, the layering drivers may have multiple operating states, such as a "normal" or "runtime" state, and an "install" or "create layer" state.

In particular embodiments, a method of creating a layer is disclosed herein. The layering client may receive a notification to create a layer. The notification may be received from a user interface provided on the information handling system or may be received from a remote information handling system. The layering client may determine a target storage location on a suitable storage medium from the notification, or by prompting a selection by a user of the information handling system. The layering client may reformat the target storage location if appropriate. The layering client may create a file metadata, a configuration metadata, or both on the target storage location. If any other layers are mounted, the layering client may dismount the other layers. The layering client mounts the target storage location as a layer. The layering configures the LFFD and the LRFD, if an LRFD is present, to operate in an "install" or "create layer" state. While in the "install" state, a user may install applications using standard application installer technology, and the installed applications will be created on the newly created layer. Once all applications have been installed, the layering client may receive a notification that installation is complete and that the layering system should be put back into a "normal" or "runtime" state. At this point, the layering client may dismount the newly created layer. The layering client configures the LFFD and the LRFD, if an LRFD is present, to operate in a "normal" or "runtime" state.

In particular embodiments, the layering file system filter driver (LFFD) may be loaded onto a file system stack of the information handling system's operating system. The LFFD may register with the OS to receive notifications for all file operations (e.g. create, open, close, read, write, rename, delete, directory enumeration, etc.). The LFFD is operable to allow a file operation to pass-through to the file system, or the LFFD may modify a file operation. By way of example and not by way of limitation, the LFFD may modify a file operation by blocking the operation, replicating the operation, redirecting the operation, or performing one of the operations described herein.

In the normal or runtime state, the LFFD examines each file operation and determines whether the file operation must be redirected or modified to make use of a file contained in a mounted layer. This determination may be made by performing a path lookup against metadata describing the files contained in the mounted layers. For example, the LFFD may load the file metadata for a layer when it is mounted, and then use the file metadata to perform a path lookup.

In particular embodiments, a method for handling a file open operation by the LFFD is disclosed. The LFFD receives a notification of a file open operation, and identifies the target file from the notification. Next, the LFFD may perform a path lookup against the file metadata of a first mounted layer. If there is no match, the LFFD may move to the next mounted layer and perform a path lookup against the file metadata of the next mounted layer recursively until there are no other mounted layers or a match is found. If there are no other mounted layers, the LFFD will allow the file open operation to be handled by the file system. When a path lookup results in a match, the LFFD looks for a file described by file metadata. If the file is found in the mounted layer, the LFFD modifies the file open operation by redirecting the target of the file open operation to point to the file found in the mounted layer. If no file is found in the mounted layer, the LFFD proceeds to perform a path lookup against the next mounted layer and so on. The order in which the LFFD checks the file metadata of each mounted layer may be determined by a priority or ordering assigned to the layers.

For example, assume a layer is mounted as drive E:, and the layer contains a file "Foo.txt" that is associated with the path "\Program Files\App\". If the LFFD receives a notification for a file open operation that specifies a target of "C:\Program Files\App\Foo.txt", the LFFD will perform a path lookup against the file metadata for all mounted layers. In this example, the LFFD will match the path "\Program Files\App\", and determine that the file operation may be associated with the layer mounted at E:. Next, the LFFD will check to see if there is a file "Foo.txt" in the mounted layer. In this example, the LFFD will locate the file "Foo.txt". Having made the determination that the file operation targets a file associated with a mounted layer, the LFFD will redirect the file open operation such that the file located at "E:\Program Files\App\Foo.txt" is opened instead of a file located at the same path on the C: drive, even if such a file existed. If the LFFD matches the path to a mounted layer, but the LFFD does not locate the described file within the layer, then the LFFD will allow the file operation to pass to the file system of the operating system for normal handling.

In particular embodiments, a method for handling a file directory enumeration operation by the LFFD is disclosed. The LFFD receives a notification of a file directory enumeration operation, and identifies the target file directory. For each mounted layer, the LFFD creates a file directory enumeration operation that targets the mounted layer. The results returned by the file directory enumeration operation for each mounted layer are merged together with the result of a file directory enumeration operation that is allowed to pass-through to the file system. Before returning the results, the LFFD will filter out duplicate files such that only the file associated with the highest priority layer is returned.

For example, assume there is a first layer mounted at E:, a second layer mounted at F:, and a third layer mounted at G:. When the LFFD receives a notification of a file directory enumeration operation targeting "C:\Program Files\App\", the LFFD will send file directory enumeration operations targeting "E:\Program Files\App\", "F:\Program Files\App\", and "G:\Program Files\App\". The results of these operations are merged with the result of a file directory enumeration operation that is passed-through to the file system targeting "C:\Program Files\App\". To the user or an application, the results appear to only come from a single directory while the results were generated by combining the files in four different file directories. If there are two or more files with the same name across the four different file directories, the LFFD will filter out the duplicate file names according to the priority or ordering assigned to the layers.

In particular embodiments, a method for handling a file directory enumeration operation by the LFFD using a file directory query hook is disclosed. The LFFD makes use of a directory query hook provided by file system instead of creating separate file directory enumeration operations that target each mounted layer. First, the LFFD receives a file directory enumeration operation. The LFFD identifies the highest priority layer, redirects the file directory enumeration operation to the highest priority layer, sets a flag that indicates that more results will be available, and records in metadata the next layer to be queried. When the query is returned from the highest priority layer, the initiating process receives the results, and the set flag triggers the initiating process to resubmit the file directory enumeration operation. The LFFD recognizes that the file directory enumeration operation is a continuation of a prior request, checks the metadata to identify the next layer to be queried, redirects the operation to the next layer, sets the flag indicating that more results are available, and updates the metadata to identify the next layer to be queried. The process continues until there are no more layers to check, in which case, the operation is passed-through to the file system.

During this process, the LFFD tracks the results returned by each operation, and filters duplicate files from subsequent queries to prevent multiple files with the same name appearing in the directory view.

In particular embodiments, it may be unnecessary for the LFFD to modify the behavior of other file operations if the remaining types of file operations make use of a file handle. For example, if a file open operation must be performed before a read file operation, a write file operation, or a close file operation, no modification to these file operations are necessary so long as the file operations make use of a file handle returned from a file open operation. If the target file is associated with a file in a layer, then the file handle returned by the file open operation will have been redirected to the layer resource by the LFFD. Continuing the previous example, when a file open operation targeting "C:\Program Files\App\Foo.txt" is handled by the LFFD, the LFFD returns a file handle that points to the "Foo.txt" file at its location in the layer mounted at the E: drive. Any subsequent file operations using the file handle will make use of the file located in the layer automatically.

In particular embodiments, the LFFD may perform the path lookups described herein using cached metadata. In a particular embodiment, the metadata cache is created by loading metadata stored in a layer when the layer is first mounted. The cached metadata can be stored as a hash table where paths are used as the hash key or as in-memory search tree.

In another particular embodiment, the metadata cache is implemented using Microsoft Windows registry hives. In this embodiment, the file metadata for each layer is stored in a registry hive in each layer. When the layer is mounted, the LFFD locates the registry hive containing the file metadata for the layer, and loads the registry hive into the registry. The LFFD performs path lookups by querying each layer's registry hive loaded into the registry. When a the layer is dismounted, the LFFD unloads the registry hive from the registry.

In particular embodiments, a method for handling a file create operation by the LFFD operating in an "install" or "create layer" mode is disclosed. The LFFD receives a notification of a file create operation, and determines the target path. The LFFD redirects the file create operation to a destination location on the storage medium for the mounted layer that is in an "install" state. The LFFD may update the file metadata associated with the mounted layer to include information concerning the target path and the destination location to facilitate a path lookup. The LFFD may return a file handle pointing to the destination location to the calling process.

For example, assume that the layer in an "install" state is mounted as E:. While the layering system is in install mode, the user runs an installer package for an application. The installer package attempts to create a file at the target path "C:\Program Files\App\Foo.txt". The LFFD receives a notification of the file create operation, and redirects the file create operation to the destination path "E:\Program Files\App\Foo.txt". The LFFD may update the file metadata to associate the target path "\Program Files\App\Foo.txt" with the destination path within the layer "\Program Files\App\Foo.txt". At the completion of the file create operation, the installer package receives a file handle that points to the file stored at "E:\Program Files\App\Foo.txt".

In particular embodiments, a method for handling a file modify operation by the LFFD operating in an "install" or "create layer" mode is disclosed. The LFFD receives a notification of a file modification operation, and determines the target path. The LFFD redirects the file create operation to a destination location on the storage medium for the mounted layer that is in an "install" state. If the file does not exist on the storage medium for the mounted layer, the file may be copied from the target path to the mounted layer, and then apply the modification. The LFFD may update the file metadata associated with the mounted layer to include information concerning the target path and the destination location to facilitate a path lookup. The LFFD may return a file handle pointing to the destination location to the calling process.

If the information handling system is running an operating system that uses a registry for storing configuration settings (for example, a Microsoft Windows operating system), then a layering registry filter driver (LRFD) may be provided. The LRFD may register with the OS to receive a notification for all registry operations (e.g. create key, get key value, delete key, delete key value, enumerate keys, etc.). The layering registry filter driver can allow a registry operation to pass-through to the OS's registry, or block, replicate or redirect the registry operation to target configuration metadata in a mounted layer. In the normal or runtime state, the LRFD examines each registry operation and determines whether the registry operation must be redirected or modified to make use of a registry key or value associated with a mounted layer. This determination may be made by performing a lookup against the configuration metadata stored in the mounted layers.

In particular embodiments, a method for handling a registry modification or retrieval operation by the LRFD is disclosed. The LRFD receives a notification of a registry modification or retrieval operation (e.g., get registry key value or set registry key value), and identifies the target key from the notification. Next, the LRFD queries the configuration metadata for each mounted layer in the order of priority assigned to the mounted layers. When the first match is found, the LRFD redirects the registry operation to the configuration metadata in the mounted layer associated with the first match, and returns the result to the calling process. If there is no match, the LRFD allows the registry operation to pass-through to the registry for normal handling.

For example, assume there is a first layer mounted at E:, a second layer mounted at F:, and a third layer mounted at G:. Also assume that the second layer's configuration metadata contains a key and value associated with the registry path "HKEY_LOCAL_MACHINE\SOFTWARE\Vendor\Key1", and assume that the registry also contains a key and value at the same path. When the LRFD receives a notification of a registry get key value operation targeting "HKEY_LOCAL_MACHINE\SOFTWARE\Vendor\Key1", the LRFD will query configuration metadata for the first mounted layer and not find a match, the LRFD will query configuration metadata for the second mounted layer and find a match. At this point, the LRFD will redirect the registry operation to the configuration metadata of the second layer, and the calling process will receive the value stored in the configuration metadata of the second layer. Continuing with this example, assume that the registry path does not exist in the second mounted layer. With this modification, the LRFD would query the configuration data of all three mounted layers, and not find a match. At this point, the LRFD would allow the registry operation to be handled by the registry.

In particular embodiments, a method for handling a registry enumeration operation by the LRFD is disclosed. The LRFD receives a notification of a registry enumeration operation, and identifies the target registry path from the notification. Next, the LRFD queries the configuration metadata for each mounted layer in the order of priority assigned to the mounted layers. For each queried configuration metadata, the LRFD gathers and merges all of the registry keys and values associated with the target path. If there are registry keys that are the same in more than one configuration metadata or the registry, the LRFD filters out the registry keys and values associated with the lower priority layers and the registry. The combined results are returned to the calling process.

In particular embodiments, a registry operation that requires the creation of new keys or trees while the LRFD is in a "normal" or "runtime" state is allowed to pass-through to the registry. Although this disclosure describes particular embodiments of methods for handling registry operations by the LRFD, the disclosure contemplates other embodiments of methods for handling registry operations by the LRFD.

In particular embodiments, a method for handling a registry key create operation by the LRFD operating in an "install" or "create layer" state is disclosed. The LRFD receives a notification of a registry create operation (e.g., create registry key), and identifies the target key from the notification. Next, the LRFD redirects the registry operation to the configuration metadata in the mounted layer that is in an "install" state.

In particular embodiments, the configuration metadata is registry hive stored in the layer. In such an embodiment, redirecting the registry operation comprises redirecting the registry operation from the registry to the registry hive stored in the layer.

For example, assume that the layering system is in an "install" or "create layer" state. While an application installer executes, the installer package attempts to create a new key at target registry path "HKEY_LOCAL_MACHINE\SOFTWARE\Vendor\Key1" and value "Value1". The LRFD receives a notification of the registry create key operation, and redirects the registry create key operation to the destination path "HKEY_LOCAL_MACHINE\SOFTWARE\Vendor\Key" in the registry hive stored in the layer that is mounted in the "install" state. The installer application receives a notification that the registry operation was successful, even though the new key and value were stored in a registry hive stored in the mounted layer as opposed to the registry.

In particular embodiments, a method for handling a registry key modification operation by the LRFD operating in an "install" or "create layer" state is disclosed. The LRFD receives a notification of a registry key or value modification operation (e.g., set key value), and identifies the target key from the notification. Next, the LRFD redirects the registry modification operation to the configuration metadata in the mounted layer that is in an "install" state. If the target key or entry does not already exist in the configuration metadata (e.g. the registry key being modified was previously created in the registry), the target key will be created in the configuration metadata and the modification applied. The calling process or application receives a notification that the registry operation was successful, even though the modification was not applied to the registry.

For example, assume that there is a pre-existing registry key in the registry at the registry path "HKEY_LOCAL_MACHINE\SOFTWARE\Vendor\Key1" that has a value "Value1". After the layering system switches to an "install" or "create layer" state, an application attempts to change the data of the value associated with a key. The LRFD will receive a notification of the registry modification operation, and will redirect the change to the configuration metadata stored in the layer mounted in the "install" or "create layer" state. If the key does not already exist in the layer, the key is created and the data associated with the value is set to "Value2". If the key already exists in the layer, the data associated with the value is changed to "Value2". The data of the value associated with the key in the registry is left unmodified as "Value1". The calling process is notified that the operation was successful even though the registry was not modified.

In particular embodiments, the operating system of the information handling system does not provide or use a registry for configuration data. In such embodiments, the layering system comprises a layering client and a layering file-system filter driver (LFFD) provided for the information handling system.

A layer may be shared among multiple users or devices. It may be desirable to preserve a shared layer in an unmodified form (e.g., as a gold image). Accordingly, a system and method of providing protected layered resources to an information handling system is disclosed herein.

At system boot-up, a LFFD is loaded at a layering client. The LFFD registers callbacks with an operating system of the layering client to receive callbacks and to be notified on every file operation (e.g., open, close, read, write). As a result, whenever a new layer is mounted at the layering client, the LFFD begins monitoring all file operations directed to the new layer.

In particular embodiments, the layering client mounts one or more protected layers. A protected layer may comprise a read only application layer (or read-only layer). The read only application layers are shared between one or more users and devices. A protected layer may share the same format as any other layer. For example, a protected layer may contain the same items as an unprotected layer, but also contain metadata or a flag that indicates that the layering client should handle the layer as a protected layer. The layering client mounts at least one write layer associated with a user or a device and at least one protected layer. Write layers are user or device specific and not shared with other users or devices. In the case of user-specific write layers, the contents of a user-specific write layer are private to the user with which the write layer is associated and are inaccessible by other users or devices. Similarly, in the case of device-specific write layers, the contents of a device-specific write layer are private to the device with which the write layer is associated and are inaccessible by other users or devices.

In one embodiment, the LFFD determines that a file open operation from a calling application is directed to an original file on a protected layer (e.g., by performing a path lookup). The LFFD determines if a write layer containing one of a write-layer copy of the original file and a dummy file corresponding to the original file is available (e.g. by performing a lookup using metadata for the write layer). If either a write-layer copy or a dummy file is found on a write layer, the file open operation is redirected to the write-layer copy or the dummy file, respectively. For example, a handle to the write-layer copy or the dummy file may be returned to the calling application.

If the write layer contains neither a write-layer copy or a dummy file, the LFFD creates, on a write layer, a dummy file associated with the original file with the same name and file attributes (for example, size, security descriptors, etc.) as the original file. The LFFD completes the file open operation by returning a handle to the newly created dummy file.

After a file handle has been opened, the LFFD may receive a read operation directed to an open file handle from the calling application. If the handle is to a write-layer copy, the read operation is redirected to the write-layer copy and the read operation is satisfied from the write-layer copy. If the handle is to a dummy file, the original file on the protected layer corresponding to the dummy file is opened and any read requests directed to the dummy file are served using the contents of the original file.

The LFFD may also receive a write operation directed to an open file handle from the calling application. If the handle is to a write-layer copy, the LFFD redirects the write operation to the write-layer copy. If the handle is to a dummy file, the LFFD blocks the write operation. The LFFD then replaces the dummy file with a write-layer copy of the original file corresponding to the dummy file, unblocks the write operation, and redirects the write operation to the newly created write-layer copy.

The LFFD may also receive a file close operation directed to an open file handle from the calling application. If the open file handle is to a write-layer copy, the LFFD closes the write-layer copy handle. In a particular embodiment, the LFFD compares the write-layer copy with the original file corresponding to the write-layer copy. If the write-layer copy has not been modified from the original file, the LFFD may delete the write-layer copy. If the write layer contains a dummy file, the LFFD closes the dummy file handle. In a particular embodiment, the LFFD also deletes the dummy file.

In a particular embodiment, the layering client performs a cleanup of a write layer when the protected layer is unmounted. The cleanup may include the LFFD deleting any dummy files from the write layer. The LFFD may also compare each write-layer copy to its respective original file and delete any write-layer copy that has not been modified from its respective original file.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of handling file operations comprising:
   loading one or more layering drivers of a layering client on to a file system stack of an information handling system;
   mounting, by the layering client, a protected layer comprising an original file, wherein the protected layer comprises a read-only application layer and the read-only application layer is shared between one or more users and devices;
   mounting, by the layering client, a write layer, wherein the write layer is specific to one of a user or a device;
   receiving, from a calling application, a file open request directed to the original file;
   redirecting the file open request to one of a dummy file associated with the original file or a write-layer copy of the original file, wherein the one of the dummy file or the write-layer copy is on the write layer; and
   returning, by the one or more layering drivers, a handle to the one of the dummy file or the write-layer copy.

2. The method of claim 1, wherein the write layer is associated with the one of the user or the device and contents of the write layer are private to the one of the user or the device.

3. The method of claim 1, further comprising:
   determining the write layer does not contain the one of the dummy file or the write-layer copy; and
   creating the dummy file on the write layer;
   setting a file name of the dummy file to a file name of the original file; and
   setting one or more file attributes of the dummy file to one or more corresponding file attributes of the original file.

4. The method of claim 1, further comprising:
   wherein the handle is to the dummy file;
   receiving, from the calling application, a read operation directed to the handle;
   opening the original file; and
   satisfying the read operation by reading data from the original file.

5. The method of claim 1, further comprising:
   wherein the handle is to the dummy file;
   receiving, from the calling application, a write operation directed to the handle;
   creating the write-layer copy in the write layer by copying the original file; and
   redirecting the write operation to the write-layer copy.

6. The method of claim 1, further comprising:
   receiving, from the calling application, a close operation directed to the handle;
   closing the handle; and
   deleting the one of the dummy file or the write-layer copy;
   wherein deleting the write-layer copy further comprises determining that the write-layer copy has not been modified from the original file.

7. The method of claim 1, further comprising:
   unmounting the protected layer; and
   deleting the one of the dummy file or the write-layer copy;
   wherein deleting the write-layer copy further comprises determining that the write-layer copy has not been modified from the original file.

8. One or more computer-readable non-transitory storage media embodying logic that is operable when executed to:
   load one or more layering drivers of a layering client on to a file system stack of an information handling system;
   mount, by the layering client, a protected layer comprising an original file to a first drive, wherein the protected layer comprises a read-only application layer and the read-only application layer is shared between one or more users;

mount, by the layering client, a write layer to a second drive, wherein the write layer is specific to one of a user or a device;

receive, from a calling application, a file open request directed to the original file;

redirect the file open request to one of a dummy file associated with the original file or a write-layer copy of the original file, wherein the one of the dummy file or the write-layer copy is on the write layer; and return a handle to the one of the dummy file or the write-layer copy.

9. One or more computer-readable non-transitory storage media of claim 8, wherein the write layer is associated with the one of the user or the device and contents of the write layer are private to the one of the user or the device.

10. The one or more computer-readable non-transitory storage media of claim 8 that is operable when executed to:
determine the write layer does not contain the one of the dummy file or the write-layer copy; and
create the dummy file on the write layer;
set a file name of the dummy file to a file name of the original file; and
set one or more file attributes of the dummy file to one or more corresponding file attributes of the original file.

11. The one or more computer-readable non-transitory storage media of claim 8 that is operable when executed to:
wherein the handle is to the dummy file;
receive, from the calling application, a read operation directed to the handle;
open the original file; and
satisfy the read operation by reading data from the original file.

12. The one or more computer-readable non-transitory storage media of claim 8 that is further operable when executed to:
wherein the handle is to the dummy file;
receive, from the calling application, a write operation directed to the handle;
create the write-layer copy in the write layer by copying the original file; and
redirect the write operation to the write-layer copy.

13. The one or more computer-readable non-transitory storage media of claim 8 that is operable when executed to:
receive, from the calling application, a close operation directed to the handle;
close the handle; and
delete the one of the dummy file or the write-layer copy;
wherein deleting the write-layer copy further comprises determining that the write-layer copy has not been modified from the original file.

14. The one or more computer-readable non-transitory storage media of claim 8 that is operable when executed to:
unmount the protected layer; and
delete the one of the dummy file or the write-layer copy;
wherein deleting the write-layer copy further comprises determining that the write-layer copy has not been modified from the original file.

15. An information handling system comprising:
one or more processors; and
a memory coupled to the processors comprising instructions executable by the processors, the processors being operable when executing the instructions to:
load one or more layering drivers of a layering client on to a file system stack of an information handling system;
mount, by a layering client, a protected layer comprising an original file to a first drive, wherein the protected layer comprises a read-only application layer and the read-only application layer is shared between one or more users;
mount, by the layering client, a write layer to a second drive, wherein the write layer is specific to one of a user or a device;
receive, from a calling application, a file open request directed to the original file;
redirect the file open request to one of a dummy file associated with the original file or a write-layer copy of the original file, wherein the one of the dummy file or the write-layer copy is on the write layer; and
return a handle to the one of the dummy file or the write-layer copy.

16. The information handling system of claim 15, wherein the memory coupled to the processors further comprise instructions executable by the processors, the processors being operable when executing the instructions to:
determine the write layer does not contain the one of the dummy file or the write-layer copy; and
create the dummy file on the write layer;
set a file name of the dummy file to a file name of the original file; and
set one or more file attributes of the dummy file to one or more corresponding file attributes of the original file.

17. The information handling system of claim 15, wherein the memory coupled to the processors further comprise instructions executable by the processors, the processors being operable when executing the instructions to:
wherein the handle is to the dummy file;
receive, from the calling application, a read operation directed to the handle;
open the original file; and
satisfy the read operation by reading data from the original file.

18. The information handling system of claim 15 that is further operable when executed to:
wherein the handle is to the dummy file;
receive, from the calling application, a write operation directed to the handle;
create the write-layer copy in the write layer by copying the original file; and
redirect the write operation to the write-layer copy.

19. The information handling system of claim 15, wherein the memory coupled to the processors further comprise instructions executable by the processors, the processors being operable when executing the instructions to:
receive, from the calling application, a close operation directed to the handle;
close the handle; and
delete the one of the dummy file or the write-layer copy;
wherein deleting the write-layer copy further comprises determining that the write-layer copy has not been modified from the original file.

20. The information handling system of claim 15, wherein the memory coupled to the processors further comprise instructions executable by the processors, the processors being operable when executing the instructions to:
unmount the protected layer; and
delete the one of the dummy file or the write-layer copy;

wherein deleting the write-layer copy further comprises determining that the write-layer copy has not been modified from the original file.

\* \* \* \* \*